H. LEMP.
VALVE.
APPLICATION FILED SEPT. 1, 1915.
1,235,338.
Patented July 31, 1917.
Fig. 1.
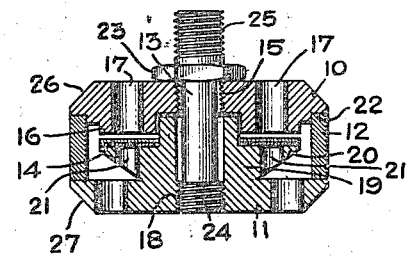
Fig. 2.
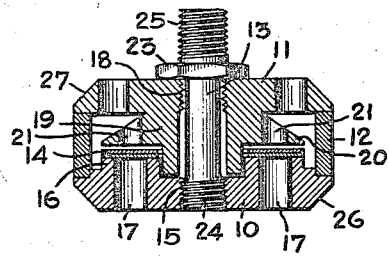
Fig. 3.
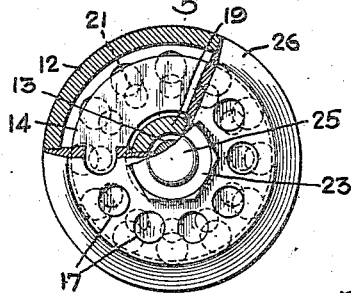
Fig. 4.
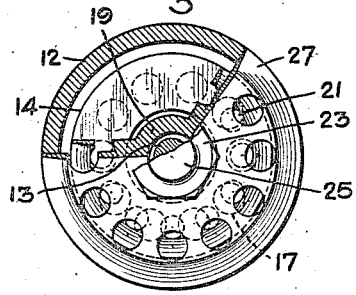
Fig. 5.
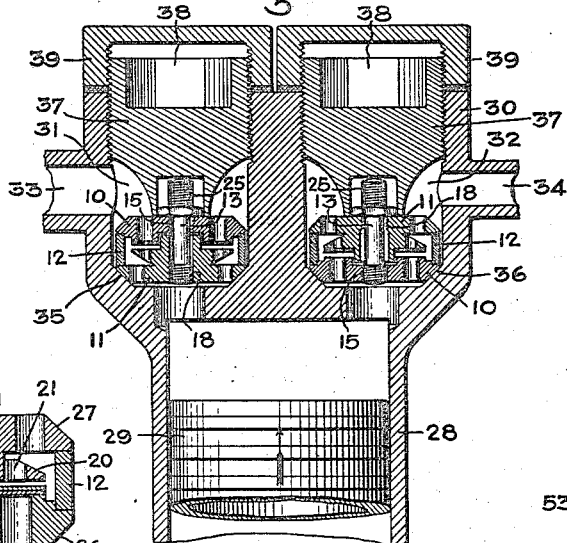
Fig. 7.
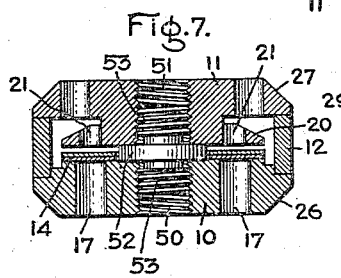
Fig. 8.
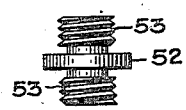
Fig. 6.
Inventor:
Hermann Lemp,
by: Albert G. Davis
His Attorney.

UNITED STATES PATENT OFFICE.

HERMANN LEMP, OF ERIE, PENNSYLVANIA, ASSIGNOR TO GENERAL ELECTRIC COMPANY, A CORPORATION OF NEW YORK.

VALVE.

1,235,338.   Specification of Letters Patent.   Patented July 31, 1917.

Application filed September 1, 1915. Serial No. 48,436.

*To all whom it may concern:*

Be it known that I, HERMANN LEMP, a citizen of the United States, residing at Erie, county of Erie, State of Pennsylvania, have invented certain new and useful Improvements in Valves, of which the following is a specification.

The present invention relates to disk valves and has for its object to provide an improved structure in a valve of this character.

For a consideration of what I believe to be novel and my invention, attention is directed to the accompanying specification and the claims appended thereto.

One application of my improved valve is the admission or discharge valve for an air compressor and in the drawing I have specifically illustrated it as applied to such use. It will be understood, however, that it is not limited thereto.

Referring to the drawing, Figure 1 illustrates my improved valve arranged to be used as an admission valve; Fig. 2 shows it reversed from the position of Fig. 1, it being then adapted for use as a discharge valve; Figs. 3 and 4 are top plan views partly broken away of Figs. 1 and 2 respectively; Fig. 5 shows the valve structure as applied to a reciprocating air compressor; Fig. 6 illustrates a modification, and Figs. 7 and 8 a further modification.

Referring to the drawing, Figs. 1 to 4, the valve comprises two body members 10 and 11, a spacing ring 12, a fastening bolt 13, and the valve disk or disks or member 14. I have found by actual tests and experiments that two disks placed one on top of the other give results superior to that obtained by a single disk of greater thickness. This, I believe, to be due to the fact that there is a certain amount of weight required and two disks on top of each other are mechanically stronger than one of twice the thickness. There is also probably an oil film formed between the two disks which has a cushioning effect. In any event, I consider the use of two disks as of advantage, although my invention is not necessarily limited to the use of two disks. The body member 10 has a central threaded opening 15 and an annular projection or boss 16 which surrounds it and through which are openings 17. The top surface of this projection or boss is finished to form a seat for the valve disks. The body member 11 has a central threaded opening 18 and an annular projection or boss 19 surrounding it and provided with a flange 20 which forms a stop for the valve disks. The boss 19 projects into, and is slightly spaced from, the inner wall of boss 16 to form a guide for the valve disks and to facilitate assembling. At the same time, it does not in any way interfere with the proper spacing of the two body members. The flange 20 is provided with openings 21 which permit air to have access to the back of the disks to close the valve, thus doing away with all springs. It is very important in a valve of this type that the valve seat and stop between which the disks play be very exactly spaced, that they give wide seating surfaces for the disks, which surfaces are perfectly parallel and that the structures be strong and rigid. This will be appreciated when it is considered that these valve disks are usually required to move very rapidly, and particularly in high pressure pumps are subjected to considerable stresses. If the valve seat and stop are too far apart the hammering of the disks against the seat and stop is excessive, while if not sufficiently far apart, the admission of the air or other fluid being compressed is hampered; and if the seat and stop are not parallel the valve will not function properly. In my improved valve I space the two members apart by means of the annular ring 12. By this means I obtain in a simple manner a very exact spacing of the seat and stop and also a structure which prevents any twisting or working of the same relative to each other. The use of a ring also has the advantages that it can be easily formed with true edges and, since it is of relatively large diameter, a slight inaccuracy will not be noticeable, or if it is, can be easily corrected. Furthermore the surfaces of the members 10 and 11 against which the ring rests are readily accessible and can be easily turned true. In the present instance, the member 10 is provided with a rabbet 22 in which the ring rests, and if desired, the other member 11 may also be rabbeted. The fastening bolt 13 is provided with a head 23 and with a slightly enlarged threaded end 24 which fits the threaded openings 15 and 18. One end of the bolt, preferably the end which carries the head, is provided with a threaded extension 25 to receive a tool for removing the valve as a whole from its casing or container. The members 10 and 11 are each provided with beveled edges as shown at 26 and 27 to insure a tight seating of the valve in its casing or container where used.

Referring now to Fig. 5 I have illustrated my improved valve as applied to a reciprocating air compressor. 28 indicates the cylinder of the compressor and 29 the piston. These may be of any suitable structure. 30 indicates a cylinder head which is provided with two chambers 31 and 32, the one having an inlet 33 and the other an outlet 34. Seated in these chambers are my improved valves. The valve in chamber 31 is, of course, acting as an inlet valve and is accordingly inserted with the member 10 which carries the seat uppermost. In this instance, therefore, the bolt 13 is inserted down through opening 15 and threaded into the opening 18 so as to bring the extension 25 to the outside. In the case of the discharge valve in chamber 32 the arrangement is the reverse. The valves are held seated in the chambers against the beveled surfaces 35 and 36 by followers 37 which are threaded into the head. They are provided with sockets 38 for the reception of a tool for inserting and removing them and are covered by threaded caps 39. In the illustration the piston 29 is indicated by the arrow as performing a discharge or compression stroke and the disks of the admission valve are accordingly against their seat, while those of the discharge valve are against their stop.

In Fig. 6 I have illustrated a modified form of my invention in which in place of using a separate bolt for fastening the two members 10 and 11 together, I form the one member with a threaded stud onto which the other screws. In the present instance the member 11 is provided with a threaded stud 40 and the member 10 with the threaded opeinng 41. In this arrangement I then provide threaded sockets 42 on opposite sides of the valve for the reception of a tool for removing it. I have also illustrated only a single disk 14, although it will be understood that two may be used. Otherwise, the structure of Fig. 6 is the same as that of Figs. 1 to 4 and embodies the same advantages, and I have accordingly applied the same reference numerals to corresponding parts. In Figs. 7 and 8 I have illustrated a further modification of my invention in which the guide means for the valve disk or disks and the means for clamping the two members together are formed as a separate part and integral with each other. In this form of the invention the members 10 and 11 are provided with central threaded openings 50 and 51 and between the two members is a spacing collar and guide member 52 having on opposite sides the threaded studs 53, onto which the members 10 and 11 screw. The guide member 52 with the threaded studs thereon is shown in Fig. 8. The manner of assembling this arrangement will be obvious. Otherwise than above noted, the arrangement of Figs. 7 and 8 is the same as that already described and corresponding reference numerals have accordingly been applied to the corresponding parts. It will be noted that the studs 53 are of less length than the thickness of members 10 and 11 so that when the parts are assembled the outer portions of openings 50 and 51 form threaded holes for the insertion of a withdrawing tool.

With the arrangement of Fig. 6, and also of Figs. 7 and 8, it will be seen that as they stand they may be used as either admission or discharge valves, depending on the way they are inserted.

As already stated, the seats for the valve disks are required to be very accurately spaced, and it is also essential that they be perfectly plane surfaces. By my improved structure wherein the two members 10 and 11 are separately formed and are spaced by another separate member, the ring, the surfaces against which the disks rest can be readily gotten at for grinding and finishing. This is of importance from a manufacturing standpoint.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a disk valve, the combination of two members, one of which has a seat and the other a stop, a separate ring arranged between the outer edges of said members to space them apart, said members being spaced apart over their entire areas, and means for clamping them together against the spacing ring.

2. In a disk valve, the combination of a member having an annular seat, a second member which comprises an annular stop adjacent said seat, a disk valve adapted to play between the seat and stop, a separate ring for spacing the two members apart, said members being spaced apart over their entire areas, and means for fastening the members against the ring.

3. In a disk valve, the combination of a member having an annular seat, a second member which comprises an annular stop adjacent said seat, a guide member between the seat and stop, two thin disk valves one on top of the other which are guided by said guide member and play between the seat and stop, a separate ring for spacing the two first named members apart, said members being spaced apart over their entire areas, and means for clamping the ring between them.

4. The combination with an air compressor, of a disk valve adapted to be used as either an admission or discharge valve therefor, comprising a member having an annular seat, a second member having an annular stop spaced from said seat, a disk valve adapted to play between the seat and stop, a separate ring between the outer edges of the two members for spacing them apart, said members being spaced apart over their entire areas and means for fastening them together against the ring.

5. The combination with an air compressor, of a disk valve adapted to be used as either an admission or discharge valve therefor, comprising a member having an annular seat, a second member having an annular stop spaced from said seat, a guide located between said members, two thin disks which play between the seat and stop and are guided by said guide, a separate spacing ring between the outer edges of the two members, said members being spaced apart over their entire areas, and means for clamping them together against the ring.

6. A disk valve comprising a member having a central threaded opening and an annular valve seat surrounding it, there being ports therein for the passage of fluid, a second member having a central threaded opening with a projecting boss surrounding it, said boss carrying an annular stop which is spaced from the said seat, an annular guide member located between said members and carrying threaded studs which are threaded into said openings to unite the two members, a disk which is located between the seat and stop and is guided by said guide member, and a spacing ring arranged between the outer edges of said members.

In witness whereof, I have hereunto set my hand this 30th day of of August, 1915.

HERMANN LEMP.